United States Patent [19]
Snowden et al.

[11] Patent Number: 5,495,491
[45] Date of Patent: Feb. 27, 1996

[54] SYSTEM USING A MEMORY CONTROLLER CONTROLLING AN ERROR CORRECTION MEANS TO DETECT AND CORRECT MEMORY ERRORS WHEN AND OVER A TIME INTERVAL INDICATED BY REGISTERS IN THE MEMORY CONTROLLER

[75] Inventors: Ralph E. Snowden; Douglas R. Kraft; Eugene H. Gruender, Jr., all of Austin, Tex.

[73] Assignee: Motorola, Inc., Schaumburg, Ill.

[21] Appl. No.: 26,668

[22] Filed: Mar. 5, 1993

[51] Int. Cl.[6] .................................................. G11C 29/00
[52] U.S. Cl. ........................................ 371/40.2; 371/40.1
[58] Field of Search .................................. 371/40.2, 40.1

[56] References Cited

U.S. PATENT DOCUMENTS

| | | | |
|---|---|---|---|
| 4,369,510 | 1/1983 | Johnson et al. | 371/13 |
| 4,408,326 | 10/1983 | Takeuchi et al. | 371/38.1 |
| 4,506,362 | 3/1985 | Morley | 371/13 |
| 4,535,455 | 8/1985 | Peterson | 371/13 |
| 4,542,454 | 9/1985 | Breich et al. | 371/13 |
| 4,577,319 | 3/1986 | Takeuchi et al. | 371/38.1 |
| 4,625,301 | 11/1986 | Berger | 365/222 |
| 4,905,198 | 2/1990 | Oishi et al. | 365/222 |
| 4,935,900 | 6/1990 | Ohsawa | 371/38.1 |
| 4,964,129 | 10/1990 | Bowden, III et al. | 371/40.2 |
| 5,077,737 | 12/1991 | Leger et al. | 371/10.1 |

*Primary Examiner*—Hoa T. Nguyen
*Attorney, Agent, or Firm*—Harold C. McGurk, IV; S. Kevin Pickens

[57] ABSTRACT

A burst error scrubbing system and method consecutively detects and corrects errors in all of memory, beginning with data stored at the first address of memory and continuing until data stored at the last address of memory is read, corrected and written back to memory. Burst error scrubbing is not performed during a refresh cycle but instead is programmable so that the burst scrubbing can be performed at a specific time interval.

1 Claim, 2 Drawing Sheets

5,495,491

SYSTEM USING A MEMORY CONTROLLER CONTROLLING AN ERROR CORRECTION MEANS TO DETECT AND CORRECT MEMORY ERRORS WHEN AND OVER A TIME INTERVAL INDICATED BY REGISTERS IN THE MEMORY CONTROLLER

TECHNICAL FIELD

This invention relates generally to error detection and correction systems and methods and, in particular, to a system and method for scrubbing consecutively all of memory at a programmable time interval.

BACKGROUND OF THE INVENTION

The terms "error scrub" and "error scrubbing" mean the process of detecting and correcting errors in an error detection and correction (EDAC) protected memory system although data transfers to and from memory may not occur over extended periods of time. If a soft error (i.e., an error due to radiation-induced bit switching) occurs in memory, the error scrubbing system reads memory, corrects the error and then writes the corrected data back to the memory. The EDAC process helps to reduce the likelihood of non-correctable failures occurring due to multiple soft errors.

Current error scrubbing utilizes DRAM (dynamic read access memory) refresh cycles to perform the error scrubbing operation. In these conventional error scrubbing systems, if no error is detected, a refresh cycle consists only of a read cycle. If an error is detected, conventional memory scrubbing systems must execute a read-correct-write cycle. This type of memory scrubbing system and method has a negative effect on system performance because it increases the time consumed by memory read cycles or read-modify-write cycles in comparison to a normal refresh cycle. Furthermore, the negative impact is constant because the refreshes or scrub cycle requests must be performed periodically.

Conventional EDAC systems and methods also prevent the use of column address strobe (CAS) before row address strobe (RAS) refresh and elimination of the refresh address counter. Conventional error scrubbing techniques also complicate memory controller design by requiring a simple refresh cycle to be translated into a complex memory cycle.

Therefore, there exists a significant need to perform error scrubbing on memory other than during refresh cycles so that time consumed by the error scrubbing does not negatively impact system design and performance.

SUMMARY OF THE INVENTION

The present invention has utility in performing at a programmable time interval a burst error scrubbing operation wherein all memory errors in an entire memory are consecutively detected and corrected.

Thus it is an advantage of the present invention to detect and correct consecutively all memory errors in an entire memory by performing back-to-back read, correct, and write cycles on the entire memory.

Yet another advantage of the present invention is to perform consecutively memory error scrubbing other than during refresh cycles so that there is better system performance while maintaining data integrity.

It is another advantage of the present invention to program when a memory error scrubbing operation will be performed and to automatically perform the burst error scrubbing at the preset time interval.

Yet another advantage of the present invention is to schedule memory error scrubbing during low demand periods or during times of minimal system utilization.

Another advantage of the present invention is to perform a burst scrub of memory but still allow the memory system to perform normal read or write operations.

It is also an advantage of the present invention to make the burst error scrubbing operation transparent to normal memory functions.

According to one aspect of the invention, a system is provided for consecutively detecting and correcting memory errors. The system comprises memory for storing data, an error correction data multiplexer connected to the memory to detect and correct errors in the data stored in the memory, and a memory controller connected to the multiplexer and the memory to initiate and control a burst error scrub on the memory.

According to another aspect of the invention, a method is provided which is executed by a computer as part of a computer program for detecting and correcting errors in data stored in memory. The method comprises the steps of: (a) programming a time interval when a burst scrub of the memory will be performed; and (b) burst scrubbing the memory at the programmed time interval by reading consecutively the data from the memory, detecting and correcting errors in the data, and writing the corrected data back to the memory.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF THE PREFERRED EMBODIMENTS

The terms "burst scrub" or "burst error scrubbing" mean consecutively or successively reading data from each location in memory, correcting the data, and writing the corrected data back to memory. A burst scrub starts reading data from the first address in memory and does not stop detecting and correcting errors until data stored in the last address of memory is read, corrected, and written to memory at its original address.

Figure 1:
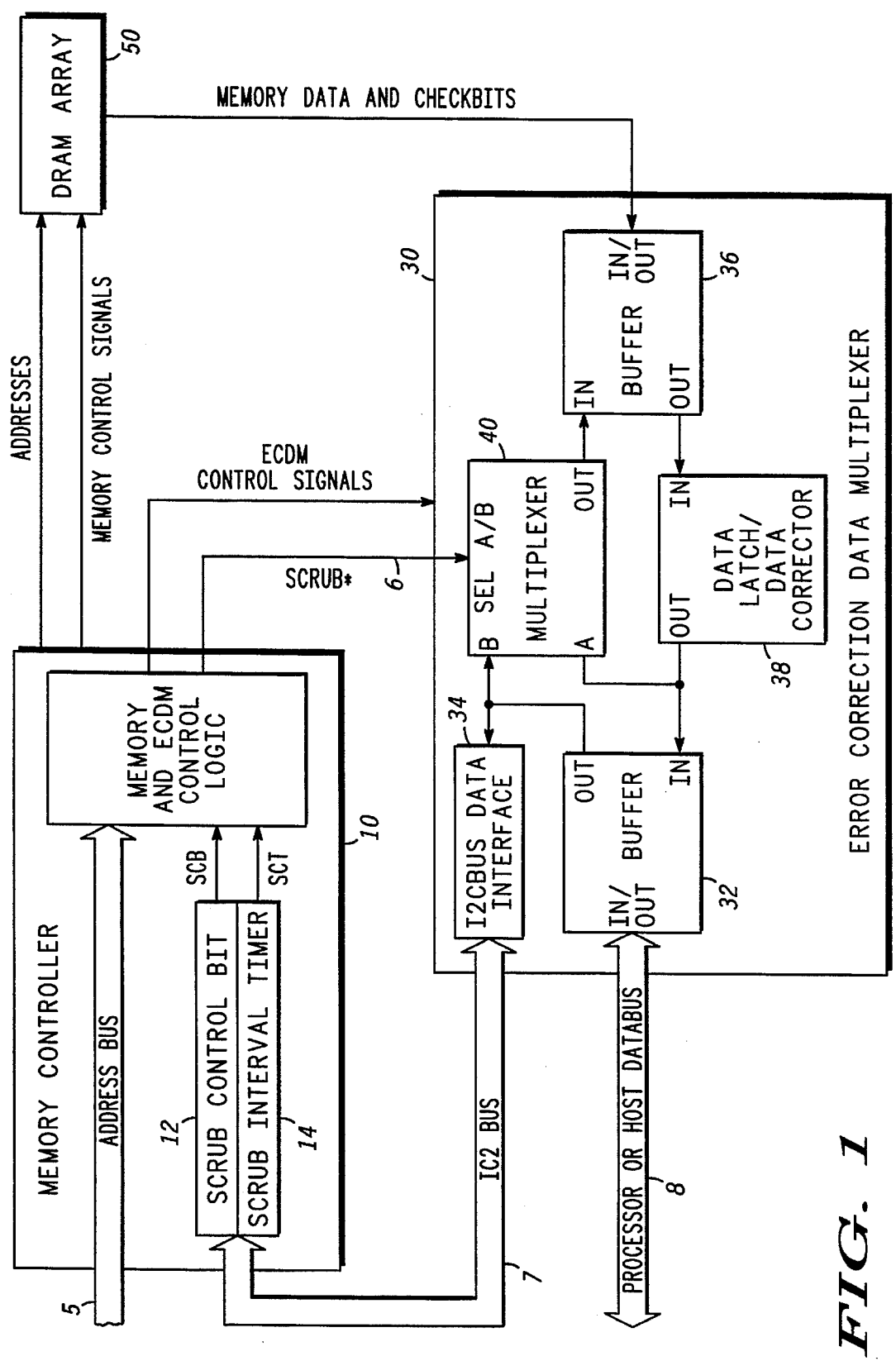
FIG. 1 shows a burst error scrubbing system in accordance with a preferred embodiment of the invention.

FIG. 1 shows a burst error scrubbing system in accordance with a preferred embodiment of the invention. The burst error scrubbing system shown in FIG. 1 comprises a memory controller 10, an error correction data multiplexer (ECDM) 30, and a dynamic random access memory (DRAM) array 50.

The main purpose of memory controller 10 is to control both ECDM 30 and all memory functions of DRAM array 50 including read, write, and refresh. Memory controller 10 is also responsible for initiating when a burst error scrub operation will be performed on DRAM array 50.

Memory controller 10 receives address signals 5 from a bus, such as a MC88110 processor address bus, for example. Memory controller 10 provides ECDM control signals including a memory scrub ("SCRUB") signal 6 to ECDM 30 while providing memory addresses, memory timing, and control signals to DRAM array 50. The DRAM memory control and timing signals include but are not necessarily limited to RAS* (row address strobe), CAS* (column address strobe), WE* (write enable), and OE* (output enable). These signals are well known and widely used in the industry to control DRAM arrays. One of ordinary skill in the art can construct the memory and ECDM control logic necessary for implementing the well-known memory control, timing, and address signals for reading from and writing to DRAM array 50.

Memory controller 10 includes two programmable registers, a scrub control bit (SCB) register 12 and a scrub interval timer (SCT) register 14. SCB register 12 is a one bit register while SCT register 14 is eight bits in length or a one byte register. These registers control when a burst error scrubbing operation will occur according to the following table:

TABLE 1

| $SCB_0$ | $SCB_1$ | SCT | OPERATION |
|---|---|---|---|
| 0 | 0 | x | Disable burst error scrub operation |
| 1 | 0 | x | Burst scrub operation performed once |
| 1 | 1 | period | Burst scrub operation performed initially and every time SCT period of timer times-out |

In Table 1, $SCB_0$ represents a state of the scrub control register 12 at one point in time while $SCB1$ represents another state of the scrub control register 12 at a sequential point in time to $SCB_0$. "X" in Table 1 represents a "don't care" state of SCT register 14.

According to the first row of Table 1, if SCB register 12 remains cleared, the burst memory scrub operation will not be performed by memory controller 10. This means that the SCRUB* signal 6 connected between memory controller 10 and ECDM 30 as shown in FIG. 1 remains high. ("*C" indicates a signal with an active low assertion state). In the second row of Table 1, if SCB register 12 is set and then cleared, memory controller 10 will perform once a burst memory scrub operation on the entire DRAM array 50. The SCRUB* signal 6 will be cleared until all of memory is consecutively scrubbed, and it then will be high. According to the third row of Table 1, if SCB register 12 is set and remains set, memory controller 10 will initially perform a burst memory scrub operation on DRAM array 50. After the initial burst memory scrub operation is performed, memory controller 10 will also perform a burst memory scrub operation every time the time period of SCT register 14 times-out.

SCT register 14 contains the time interval for when the next burst memory scrub operation will occur. For example, if SCB register 12 remains set and SCT register 14 is set for a 12 hour period, memory controller 10 will perform a burst memory scrub operation on DRAM array 50 when the SCB register is set and every 12 hours thereafter. Similarly, the time interval could be programmed for a 24 hour period so that a burst memory scrub operation is performed every 24 hours. By being able to set the time interval, the system can perform a burst memory scrub operation when DRAM array 50 is being accessed least and when it would be least disruptive to normal system operations.

As shown in FIG. 1, I2Cbus 7 is used to program SCB register 12 and SCT register 14. SDA (serial data) and SCL (serial clock) form a two-wire serial data transmission bus for inter-integrated circuit communication widely known in the industry as I2Cbus. In other words, I2Cbus 7 is an industry standard protocol that is used to transmit data between integrated circuits in a pin efficient manner.

I2Cbus 7 is used to program SCB 12 and SCT 14 registers by writing an 8 bit data value to a temporary register (bi-directional buffer) 32 in ECDM 30. ECDM 30 serializes the data using I2Cbus data interface 34 and transmits it to memory controller 10 which de-serializes the data and programs its internal registers with the value of the 8 bit data. I2Cbus 7 is used to program memory controller 10 without adding a data bus to memory controller 10. However, SCB 12 and SCT 14 registers could be programmed directly from a data bus that would require more pins for connecting the memory controller 10 to a data bus.

ECDM 30 is a gate array device whose main purposes are (i) to receive data from a processor or host data bus and store the received data in memory or DRAM array 50; (ii) to retrieve data from DRAM array 50 and transmit it over the processor data bus; and (iii) to detect and correct any single-bit errors in DRAM array 50.

ECDM 30 comprises bi-directional buffers 32 and 36, data latch/data corrector 38, and data multiplexer 40. Bi-directional buffers 32 and 36, transparent latch and data corrector 38, and data multiplexer 40 are common, ordinary, widely used industry standard logic elements.

Bi-directional buffer 32 is connected to a processor or host data bus 8 for receiving data from and transmitting data to the processor or data bus 8. Whether bi-directional buffer 32 is receiving or transmitting data is controlled by memory controller 10. Bi-directional buffer 32 is also connected to data latch/data corrector 38 for receiving corrected data. Moreover, bi-directional buffer 32 transmits data from the data bus 8 to data multiplexer 40 and I2Cbus data interface 34.

Bi-directional buffer 36 receives from and transmits to DRAM array 50 memory data and checkbits. Bi-directional buffer 36 is also connected to data latch/data corrector 38 for transmitting memory data and checkbits received from DRAM array 50. Data multiplexer 40 transmits either corrected data or data from the processor data bus to bi-directional buffer 36 depending on whether the burst memory scrub operation is active.

Data latch/data corrector 38 comprises both a transparent data latch and a data corrector. A transparent latch, which is known widely in the industry, is a storage device used to latch data from DRAM array 50. A transparent latch is similar to a D-type flip-flop. Instead of latching data from the D input to the Q output on a clock transition, the transparent D latch allows data from the D input to flow through to the Q output when a control signal (or latch enable signal) is in one state. The transparent latch freezes data on the Q output when the control signal from memory controller 10 switches to the opposite state. The transparent latch used may be a SN54LS/74S373 which is manufactured by Motorola, for example.

The error detection and correction circuitry of data corrector 38 employs a well-known industry standard method known as a modified Hamming code. Both Advanced Micro Devices (part number Am29C660) and Texas Instruments (part number SN74AS632A) produce an error detection and correction unit 38, for example. Error detection and correction unit 38 detects and corrects single bit-errors that would otherwise halt the system.

Data multiplexer 40 shown in FIG. 1 is well known to one of ordinary skill in the art. As shown in FIG. 1, if SCRUB* is low, corrected data and checkbits transmitted from data latch/data corrector 38 is output to DRAM array 50 via bi-directional buffer 36. Otherwise, when SCRUB* is high, data received from the data processor bus is transmitted to bi-directional buffer 36.

DRAM array 50 comprises various industry-standard DRAM devices to implement error detection and correction for 64 bits of data with eight check bits. For example, Toshiba manufactures a DRAM, part number TCS14402, which can be used in this invention. As shown in FIG. 1, error detection and correction for a 64-bit DRAM array 50 is handled by one ECDM 30. Although the configuration shown in FIG. 1 has a DRAM array 50 of 64 data bits, DRAM array 50 could as well be 128 or 256 bits of data. Therefore, if a DRAM array had 256 bits of data, the data would be divided into four 64-bit sections, and error detection and correction for each 64-bit section would be handled by one of four ECDMs 30.

In order to achieve double-bit error detection and single-bit correction for 64 bits of data, eight check bits must be stored for each 64-bit word. Other components could be used to duplicate the functions performed by memory controller 10 and ECDM 30. These components could be standard TTL or programmable logic devices such as PAL's. However, it would require a significant number of these MSI (medium scale integrated) devices to implement the design and methods of the memory controller 10 and ECDM 30. It is more likely that these methods would be implemented in custom gate array designs similar to the memory controller 10 and ECDM 30.

Figure 2:
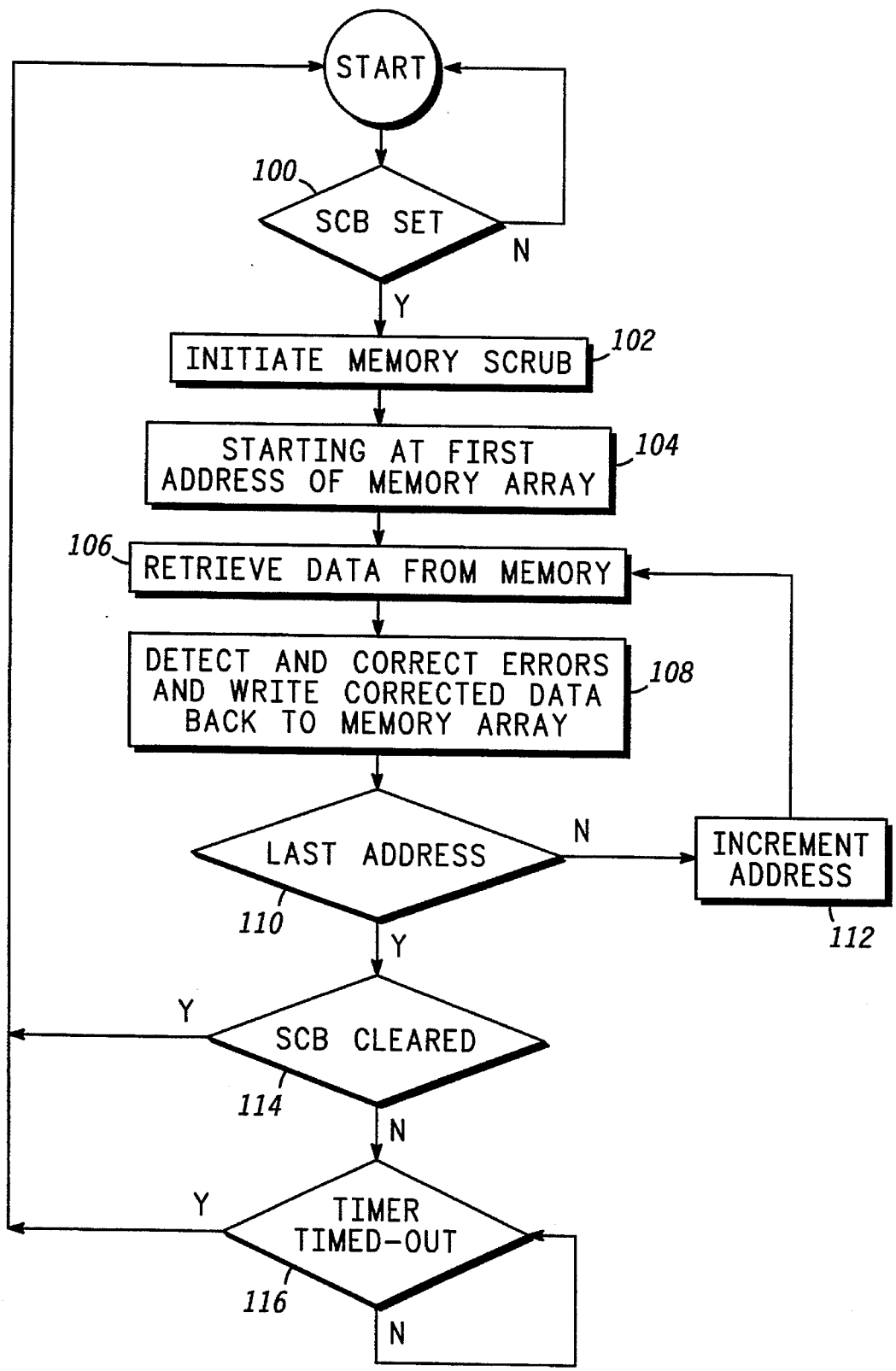
FIG. 2 shows a burst error scrubbing method in accordance with a preferred embodiment of the invention.

A method of detecting and correcting errors in burst mode in accordance with a preferred embodiment of the invention is shown in FIG. 2. Memory controller 10 determines in step 100 whether SCB in SCB register 12 is set. If SCB is set via I2Cbus interface described above, memory controller 10 will begin to perform the burst error scrubbing operation in step 102 by clearing the SCRUB* signal line. Otherwise, if SCB is zero or cleared, memory controller 10 is disabled from performing the automatic burst error scrubbing operation and the loop repeats until SCB is set.

Once memory controller 10 initiates a burst memory scrub in step 102 by clearing SCRUB*, memory controller 10 begins scrubbing memory at the first address of DRAM array 50 in step 104. Memory controller 10 in step 106 transmits the first address and control signals to DRAM array 50. Memory controller 10 in step 106 also sends ECDM 30 control signals so that bi-directional buffer 36 will receive the data and check bits once a read operation is performed on DRAM array 50. Once data is received by ECDM 30 in step 106 at bi-directional buffer 36, ECDM 30 in step 108 stores the retrieved data and checkbits in the transparent latch and corrects any single bit errors using modified Hamming code. As explained above, the latching mechanism is an industry standard, and the data corrector is based on an industry standard method known as a modified Hamming code.

Instead of outputting the corrected data to the processor or host data bus through bi-directional buffer 32 (as would be the case for normal read operations), the corrected data is provided to data multiplexer 40. When SCRUB* is asserted, data multiplexer 40 selects data from the data latch/data corrector 38 rather than bi-directional buffer 32. The corrected data is provided from data multiplexer 40 to bi-directional buffer 36 which writes the corrected data back to DRAM array 50 in step 108.

After data is written back to DRAM array 50 in step 108, memory controller 10 determines whether the memory scrub was performed on the last address of DRAM array 50. If it was not the last address, memory controller 10 increments the address in step 112 and repeats steps 106, 108 and 110 until the last address of DRAM array 50 is reached. In other words, memory controller 10 and ECDM 30 repeat this process of reading data from DRAM array 50, correcting the data, and writing the corrected data back to DRAM array 50 for each address of the DRAM array, starting with the first address of DRAM array 50 until the last address of DRAM array 50. This process does not terminate until the entire DRAM array 50 is scrubbed. Scrubbing the entire memory array 50 is completed in a time period ranging from few microseconds to a few seconds depending on the size of the DRAM array 50.

Once the entire DRAM array 50 has been burst scrubbed in step 110, memory controller in step 114 determines whether SCB is cleared. If SCB is cleared in step 114, memory controller 10 will only scrub the entire DRAM array 50 once according to the second row of Table 1 and will return to step 100 of FIG. 2. If SCB is set in step 114, memory controller 10 waits in step 116 until the time interval times-out before performing another burst memory scrub on the entire DRAM array 50.

If a processor makes a request for data from memory while the burst error scrub method is executing according to the method shown in FIG. 2, memory controller 10 will temporarily suspend operation of the burst error scrub of memory by clearing and setting the appropriate control, timing, and address signals. SCRUB* will be cleared until a normal read or write function is performed. Once the normal DRAM read or write function is performed, memory controller 10 will once again re-assert SCRUB* and continue the burst memory scrub from where it left off.

It will be appreciated by those skilled in the art that the present invention performs a memory scrub on an entire memory array at programmable time intervals. Moreover, the memory scrub is not performed with the refresh cycles, thus increasing overall system design, performance, and throughput.

Accordingly, it is intended by the appended claims to cover all modifications of the invention that fall within the true spirit and scope of the invention.

What is claimed is:

1. A system for consecutively detecting and correcting memory errors, said system comprising:

memory for storing data;

error correction means, connected to said memory, for reading, correcting and writing said data stored in said memory;

a memory controller connected to said error correction means and said memory to control said error correction means to successively read, correct and write the data stored in each memory location in said memory;

said memory controller having an interval timer register for programming a time interval over which said error correction means is to successively read, correct and write the data stored in each memory location in said memory; and said memory controller having a scrub control register for indicating to said error correction means that said error correction means is to successively read, correct and write the data stored in each memory location in said memory.

* * * * *